(12) United States Patent
Ibaraki et al.

(10) Patent No.: US 9,034,074 B2
(45) Date of Patent: May 19, 2015

(54) PROCESS FOR PRODUCING REDUCED IRON PELLETS, AND PROCESS FOR PRODUCING PIG IRON

(75) Inventors: Tetsuharu Ibaraki, Tokyo (JP); Hiroshi Oda, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 222 days.

(21) Appl. No.: 12/673,141

(22) PCT Filed: Sep. 11, 2008

(86) PCT No.: PCT/JP2008/066458
§ 371 (c)(1),
(2), (4) Date: Feb. 11, 2010

(87) PCT Pub. No.: WO2009/035053
PCT Pub. Date: Mar. 19, 2009

(65) Prior Publication Data
US 2011/0023657 A1 Feb. 3, 2011

(30) Foreign Application Priority Data

Sep. 14, 2007 (JP) ................................ P2007-239058
Sep. 4, 2008 (JP) ................................ P2008-227163

(51) Int. Cl.
| C21B 5/00 | (2006.01) |
| C21B 11/06 | (2006.01) |
| C22B 5/10 | (2006.01) |
| C21B 13/00 | (2006.01) |
| C21B 13/10 | (2006.01) |
| C22B 1/245 | (2006.01) |

(52) U.S. Cl.
CPC ............... *C22B 5/10* (2013.01); *C21B 13/0046* (2013.01); *C21B 13/105* (2013.01); *C22B 1/245* (2013.01)

(58) Field of Classification Search
USPC .......................................................... 75/369
See application file for complete search history.

(56) References Cited

U.S. PATENT DOCUMENTS

| 3,716,352 | A | * | 2/1973 | Ooi et al. .......................... 75/309 |
| 3,751,241 | A | * | 8/1973 | Sloughfy et al. ............... 428/557 |
| 4,248,624 | A | | 2/1981 | Novoa et al. |
| 5,258,054 | A | * | 11/1993 | Ebenfelt .......................... 75/443 |
| 5,948,139 | A | | 9/1999 | Kepplinger et al. |
| 6,129,777 | A | * | 10/2000 | Fuji et al. ......................... 75/484 |
| 6,284,017 | B1 | * | 9/2001 | Kamei et al. ..................... 75/484 |
| 6,302,938 | B1 | * | 10/2001 | Kamijo et al. ................... 75/316 |
| 6,592,649 | B2 | * | 7/2003 | Kikuchi et al. .................. 75/504 |
| 6,602,320 | B2 | * | 8/2003 | Fuji et al. ......................... 75/484 |
| 6,986,801 | B2 | * | 1/2006 | Ibaraki et al. .................... 75/484 |
| 2003/0089200 | A1 | * | 5/2003 | Ibaraki et al. .................... 75/527 |
| 2004/0020326 | A1 | * | 2/2004 | Ibaraki et al. .................... 75/313 |
| 2006/0070495 | A1 | * | 4/2006 | Ito et al. ........................... 75/503 |
| 2006/0169103 | A1 | * | 8/2006 | Ito et al. ........................... 75/484 |

FOREIGN PATENT DOCUMENTS

| CA | 2383860 | A1 | | 3/2001 | |
| CA | 2427521 | A1 | | 4/2003 | |
| CA | 2669796 | A1 | * | 5/2008 | ............... C22B 1/16 |
| EP | 1340822 | A1 | | 9/2003 | |
| JP | 11-12627 | A | | 1/1999 | |
| JP | 11-117010 | A | | 4/1999 | |
| JP | 2000-34526 | A | | 2/2000 | |
| JP | 2001-234213 | A | | 8/2001 | |
| JP | 2001-303115 | A | | 10/2001 | |
| JP | 2004-218019 | A | | 8/2004 | |
| RU | 2122586 | C1 | | 11/1998 | |

OTHER PUBLICATIONS

No author, "The making, shaping and treating of steel", Apr. 1957, United Stated Steel Corp., 7th Edition, 2nd Impression, pp. 228-232.*
Ibaraki et al., "Dust recycling technology by the rotary hearth furnace at Nippon Steel's Kimitsu Works", La Revue de Métallurgie, Cahiers d'Inf. Tech., Oct. 2002, vol. 99, 10, p. 809-818.
Extended European Search Report for Application No. 08830144.5 dated Nov. 5, 2010.
Canadian Office Action dated Jul. 20, 2011 for Canadian Application No. 2,707,423.
Russian Decision on Grant, dated Oct. 14, 2011, for Russian Application No. 2010109068/02, including English translation.

* cited by examiner

*Primary Examiner* — George Wyszomierski
(74) *Attorney, Agent, or Firm* — Birch, Stewart, Kolasch & Birch, LLP (57) ABSTRACT

In a method for producing a reduced iron pellet, when a powder formed article including iron oxide and carbon is heated and reduced in a rotary hearth furnace, a formed article produced using a raw material, in which an average diameter of the iron oxide is 50 microns or less and a ratio of carbon monoxide to carbon dioxide in a reduction zone is from 0.3 to 1, is reduced at a temperature of 1400° C. or less, thereby producing a reduced iron pellet in which a metallization ratio of iron is 50 to 85% and a ratio of residual carbon is 2% or less.

16 Claims, 2 Drawing Sheets

PROCESS FOR PRODUCING REDUCED IRON PELLETS, AND PROCESS FOR PRODUCING PIG IRON

TECHNICAL FIELD

The present invention relates to a method for producing reduced iron pellets for producing partial reduced iron by reducing powder including iron oxide and carbon using a rotary hearth furnace. In addition, the present invention relates to a method for producing pig iron for producing hot metal by reducing and melting the partial reduced iron (reduced-iron containing material) in a blast furnace or a vertical shaft furnace.

Priority is claimed on Japanese Patent Application No. 2007-239058 and 2008-227163, the contents of which are incorporated herein by reference.

BACKGROUND ART

There are many kinds of metal reducing processes for producing reduced iron or alloy steel. As a process with low cost and high productivity among the processes, an operation using a rotary hearth furnace (hereinafter, referred to as RHF) has been performed, and an outline of the process is described, for example, in Patent Document 1.

Figure 1:
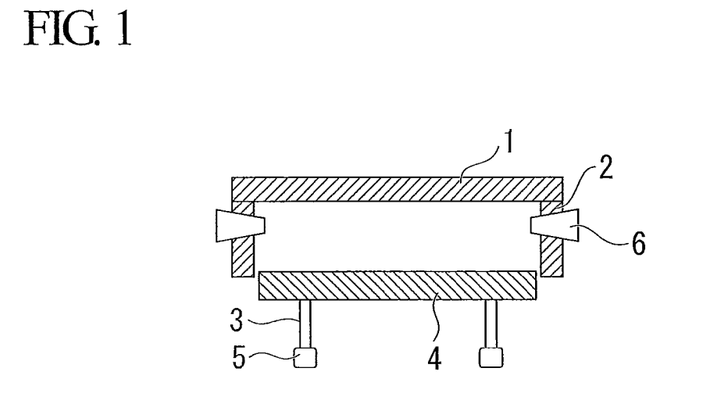
FIG. 1 is a diagram illustrating a structure of a rotary hearth furnace.

FIG. 1 shows a section of an RHF in a diameter direction. The RHF is a burning furnace (hereinafter, referred to as a rotary furnace) in which a refractory hearth 4 having a disk shape without a center on a wheel 3 rotates at a predetermined rate on a rail 5 describing a circle, under a ceiling 1 and a side wall 2 of a fixed refractory. The side wall 2 is provided with a plurality of burners 6, from which fuel and air are fed into control an atmosphere gas component and a temperature in the furnace. Generally, a diameter of the hearth of the rotary furnace is 10 to 50 meters, and a width thereof is 2 to 8 meters. A formed article as a raw material formed of powder including metal oxide and carbon is supplied onto the hearth 4, and is heated by radiant heat from upper gas in the furnace, thereby obtaining metal in the formed article by a reaction of the metal oxide and the carbon in the formed article.

Figure 2:
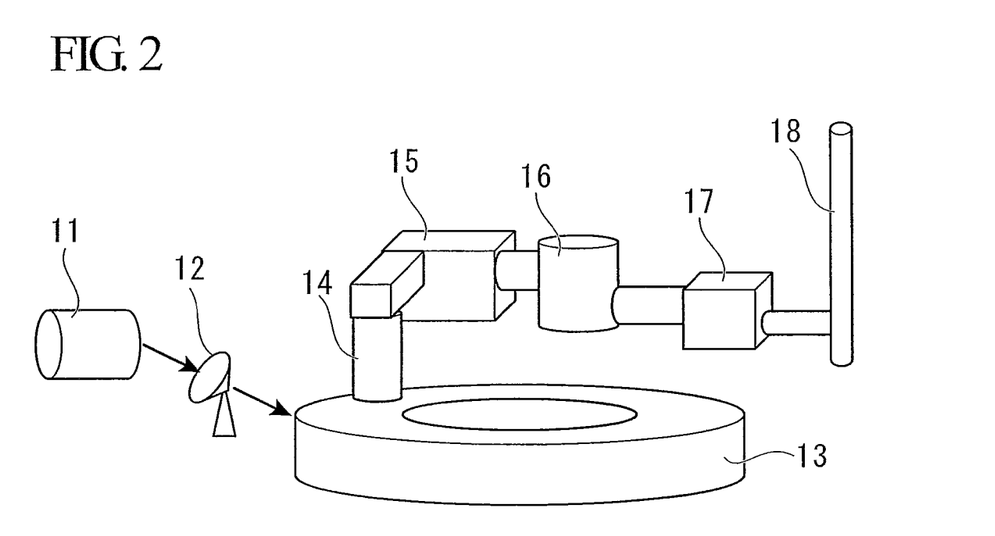
FIG. 2 is a diagram illustrating the whole process using a rotary hearth furnace.

FIG. 2 shows an example of the whole equipment of the RHF.

Metal oxide such as powdered ore and metal oxide dust is used as a raw material, and carbon is used as a reductant. Particle iron ore such as pellet feed as a metal oxide source, or a by-product material produced from an iron producing process such as converter dust, sintered dust, and blast gas dust is used in producing reduced iron. Coke, oil coke, coal, and the like are used as carbon that is a reductant. It is more preferable that a ratio of carbon powder that is not volatilized is more preferable, up to 1100° C. as a temperature at which a reduction reaction occurs. Such a carbon source is powder coke or anthracite.

In a ball mill 11 that is a mixing device shown in FIG. 2, powder including metal oxide and powder including carbon are mixed, and the mixture is formed into a granular form in a granulation device 12. The formed article is supplied onto the hearth 4 of the rotary furnace 13 to be uniformly laid. In the rotary furnace 13, the formed article is moved to each portion in the furnace by rotation of the hearth 4.

The formed article is heated at 1000° C. to 1500° C. by radiation of high temperature gas, and the metal oxide is reduced by the carbon in the formed article. Exhaust gas generated in the furnace is thermally collected in a boiler 15 and a heat exchanger 16 through an exhaust gas duct 14, dust is removed from the exhaust gas in a dust collector 17, and then the exhaust gas is discharged from a chimney 18 to the air. In the rotary furnace 13, the formed article is settled on the hearth 4, and thus there is an advantage that the formed article is hardly collapsed in the furnace. As a result, there is an advantage that there is no problem caused by attaching the raw material formed into powder on the refractory. In addition, there is an advantage that a powder raw material or a coal-based reductant with high productivity and low price can be used.

A metallization ratio of the reduced iron produced by such a method is generally 90% or less, and the maximum thereof is about 95%. The metallization ratio is relatively low as compared with directly reduced iron (hereinafter, referred to as DRI) produced by a gas reducing method such as a MIDREX method.

In the gas atmosphere in the RHF, carbon dioxide concentration is relatively high, and thus the furnace is not suitable for reduction substantially. However, since the iron oxide and the carbon are mixed in the formed article, an active reaction (FetO+C→tFe+CO) occurs in the formed article. Accordingly, there is reduction ability. As a result of the reaction, a ratio of carbon monoxide in the formed article and around the formed article gets higher, and a reduction property is atmospherically high around the formed article. Accordingly, the reduction of the iron oxide proceeds. However, when the ratio of metal iron in the formed article gets higher, a reduction reaction rate gets lower by the decrease of the ratio of the iron oxide. Accordingly, the ratio of the carbon monoxide in the formed article and around the formed article decreases. Therefore, when the metallization ratio is high, there is a problem that the reduction is delayed.

For example, as described in Patent Document 2, there is a method for producing the reduced iron with high strength, in which the high strength reduced iron is supplied to a blast furnace together with massive ore or sintered ore to produce pig iron. In this method, since preliminarily reduced iron oxide is finally reduced in a blast furnace, thermal load of the blast decreases. Accordingly, there are effects that coke consumption of the blast furnace decreases and production of pig iron increases.

A general method for operating a blast furnace using reduced iron has been performed from old times. For example, as described in Patent Document 3, a technique for using a large amount of reduced iron is disclosed. In case of using a large amount of reduced iron with high reduction ratio or scrap, there is described a technique of controlling a temperature in a furnace by controlling a blowing air temperature or an amount of blowing dust coal.

In a vertical furnace other than a blast such as a cupola, an operation for melting reduced iron together with scrap has been performed. For example, as described in Patent Document 4, massive coke and scrap are fed in a furnace, air or oxygen containing air heated from a lower part of the furnace is blown in, and the massive reduced iron (Hot Briquette Iron (HBI) or DRI) is molten together with the scrap in the production of melting the scrap, thereby producing pig iron.

[Patent Document 1] Japanese Unexamined Patent Application, First Publication No. 2001-303115
[Patent Document 2] Japanese Unexamined Patent Application, First Publication No. 2004-218019
[Patent Document 3] Japanese Unexamined Patent Application, First Publication No. 2001-234213
[Patent Document 4] Japanese Unexamined Patent Application, First Publication No. H11-117010
[Non-Patent Document 1] "Dust Recycling Technology by the Rotary Hearth Furnace at Nippon Steel's Kimitsu Works", Revue de Metall. Cahiers d'Inf. Tech. (2002) Vol. 99, (10), p. 809-818, T. Ibaraki and H. Oda

DISCLOSURE OF THE INVENTION

Problem that the Invention is to Solve

In an operation of combination of an RHF and a blast furnace, for example, as a technique described in Patent Document 2, reduced iron pellets with a middle reduction ratio and high strength are produced in the RHF, and the reduced iron pellets are reduced and molten in the blast furnace. However, in such a known method, there is no viewpoint of improvement of a technique for raising a usage ratio in the furnace. For example, as described in Non-Patent Document 1, usage of reduced iron pellets is about 2 to 3% (25 to 40 kg/ton per produced pig iron). That is, even in a large-size blast furnace of 10,000 tons per day, usage of reduced iron pellets per day is as small as 250 to 400 tons.

As a result, the total production of reduced iron pellets produced by a steel dust process in a steel works with a process amount per day of hundreds of tons can be processed in the blast furnace. However, when iron ore is processed in the RHF to produce a large amount of reduced iron, hundreds of tons to thousands of tons of reduced iron per day are produced. When pig iron is produced using this amount of reduced iron pellets as a raw material in a blast furnace, usage of the reduced iron pellets is as high as 60 to 200 kg per 1 ton of produced pig iron even in a large-size blast furnace.

However, in the known technique such as Patent Document 2 and Non-Patent Document 1, usage of reduced iron pellets is low. For this reason, a final reduction state or a melting state of reduced iron pellets in a furnace is not controlled with only thought of just charging the reduced iron pellets into the furnace. In the RHF operation, there is no technique for easily reducing residual oxides of reduced iron pellets in a blast furnace, with only a viewpoint of just charging high-strength reduced iron pellets. As a result, reduction of the iron oxide remaining in the reduced iron pallets is delayed. Accordingly, the reduction is not finished at the middle of a blast furnace shaft, and the iron oxide goes into a spot where slag at a lower part of the furnace is collected. In this case, reduction of the iron oxide occurs in the slag, and thus there is a problem that a temperature of the slag or the lower part of the furnace decreases, or there is a problem that FeO in the slag increases and thus desulfurization performance of the slag decreases.

When using a technique described in Patent Document 3, it is possible to appropriately use a relatively large amount of reduced iron in a blast furnace by controlling operation conditions of the blast furnace. However, in this technique, presupposition is to use reduced iron with a high metallization ratio produced by a reducing process such as MIDREX that is the known technique. That is, in this technique, it is not considered to use reduced iron with a low metallization ratio produced in the RHF. In the reduced iron with a high metallization ratio, there is little iron oxide remaining therein. As a result, it is possible to produce molten iron only by heating and melting the reduced iron. Accordingly, there is no description how to reduce the iron oxide in the reduced iron with a low reduction ratio. The reduced iron pellet produced in the RHF, a metallization ratio of which is 50 to 85%, includes a large amount of metal oxide therein. Accordingly, in the reduced iron pellet, reduction of the iron oxide therein is important. Even in the technique described in Patent Document 3, a reduction reaction is insufficient, and thus there are the technical problems as described above.

In a technique of melting reduced iron in a vertical shaft furnace, to reduce and melt reduced iron pellets with a row metallization ratio as described in Patent Document 4, a special operation is necessary. That is, when using reduced iron with a low reduction degree, it is necessary to accurately control an input position of coke and iron source (scrap or reduced iron) and thus a special device for the control is necessary. Accordingly, it is difficult to generally embody this technique. Even when using such a special technique, the reduction of iron oxide in reduced iron is delayed. Therefore, a problem caused by increase of FeO of a slag easily occurs. For this reason, there is a problem that it is possible to use only reduced iron with a low reduction ratio and a small diameter of 5 millimeters or less in which reduction is rapid. As described above, in the known technique, it is difficult to use a large amount of reduced iron pellets with a low reduction ratio and relatively large diameter.

As described above, in the known technique, it is difficult to use a large amount of reduced iron pellets with a low reduction ratio produced in the RHF, in a blast furnace or a vertical furnace (cupola). In the RHF, it is technically possible that reduced iron with a high reduction ratio (metallization ratio is 85% or more) is produced to use a large amount of reduced iron in a blast furnace or a vertical furnace. However, as described above, in the RHF, there is a problem that a reduction reaction is delayed by the high metallization ratio. As a result, in the case of the high metallization of 85% or more, it is necessary to add surplus carbon and to perform a high temperature process of 1400° C. or more. Accordingly, there is a problem that energy consumption for producing reduced iron deteriorates, and thus thermal efficiency is poor.

As describe above, there are many problems in producing reduced iron and processing the reduced iron in a blast furnace or a vertical furnace in large quantities to producing molten iron. Therefore, new technique to overcome the problems of the known techniques has been required.

Means for Solving the Problem

The invention has been made to solve to the technical problems at the time of hot forming a reduced iron containing material produced in the RHF described above, and the details thereof are represented by the following (1) to (16).

(1) According to the invention, there is provided a method for producing a reduced iron pellet, wherein when a powder formed article including iron oxide and carbon is heated and reduced in a rotary hearth furnace, a formed article produced using a raw material, in which an average diameter of the iron oxide is 50 microns or less and a ratio of carbon monoxide to carbon dioxide in a reduction zone is from 0.3 to 1, is reduced at a temperature of 1400° C. or less, thereby producing a reduced iron pellet in which a metallization ratio of iron is 50 to 85% and a ratio of residual carbon is 2% or less. According to the method for producing a reduced iron pellet, it is possible to produce a reduced iron pellet having a porosity of 20 to 50% and a crushing strength of 5 MPa or more.

(2) In the method for producing a reduced iron pellet according to the above (1), a sojourn time at 1200° C. or more in the rotary hearth furnace may be 8 minutes or more, and a time represented by to=69.5-0.035T or less, where a unit of to is minute, and T is an average gas temperature (° C.) in the rotary hearth furnace at 1200° C. or more. In this case, both of proper porosity and crushing strength can coexist.

(3) In the method for producing a reduced iron pellet according to the above (1), an average heating rate at a center of the formed article may be 400° C./min or less at the time of heating from 100° C. to 1000° C. In this case, in the method according to the above (1) or (2), both of proper porosity and crushing strength can further reliably coexist.

(4) In the method for producing a reduced iron pellet according to the above (1), a mass ratio of calcium oxide to silicon oxide in the formed article may be 2.2 or less.

(5) In the method for producing a reduced iron pellet according to the above (1), a content of fluorine and chlorine may be (F mass %)+0.4(Cl mass %)<0.25%.

(6) In the method for producing a reduced iron pellet according to the above (1), a content of total iron in magnesium oxide, calcium oxide, silicon oxide, and iron oxide in the formed article may be {(CaO mass %)−(MgO mass %)}/(T.Fe mass %)<0.1 and {(CaO mass %)−(MgO mass %)/(SiO2 mass %)<2.0.

In the case of the above (4) to (6), both of proper porosity and crushing strength can further reliably coexist by keeping a melting point of oxide high in the reduced iron pellet.

(7) According to invention, there is provided a method for producing pig iron, wherein a reduced iron pellet produced by heating a powder formed article including iron oxide and carbon in a rotary hearth furnace, in which a content of total iron is 55 mass % or more, a metallization ratio of iron is 50 to 85%, particles of metal iron with an average 35 microns or less are coupled to form a metal iron network between the iron oxide and a mixture of the other oxides, and a porosity is 20 to 50%, is fed into an iron producing blast furnace together with ore and sintered ore in a condition that a ratio of 5 to 20 mm is 80% or more, and is reduced and molten.

(8) In the method for producing pig iron according to the above (7), the reduced iron pellet having an inner structure, in which an average diameter of oxide including the iron oxide and the iron oxide is 5 to 100 microns and is restricted by the metal iron network, may be fed into a iron producing blast furnace together with ore and sintered ore, and may be reduced and molten.

(9) In the method for producing pig iron according to the above (7), the reduced iron pellet may be fed into the iron producing blast furnace at a ratio of 250 kg/ton or less with respect to an amount of produced pig iron. In this case, it is possible to more efficiently produce molten pig iron.

(10) In the method for producing pig iron according to the above (7), the reduced iron pellet may be fed into a position within ⅔ from the center in a diameter direction of the iron producing furnace, so that a ratio of the reduced iron pellet in the iron producing blast furnace is 65% or more.

(11) According to the invention, there is provided another method for producing pig iron, wherein when a powder formed article including iron oxide and carbon is heated in a rotary hearth furnace, the reduced iron pellet produced by the method according to the above (1) in which a content of total iron is 55 mass % or more, a metallization ratio of iron is 50 to 85%, and a porosity is 20 to 50%, is fed into an iron producing blast furnace together with ore and sintered ore in a condition that a ratio of 5 to 20 mm is 80% or more, and is reduced and molten.

(12) According to the invention, there is provided another method for producing pig iron, wherein a reduced iron pellet produced by heating a powder formed article including iron oxide and carbon in a rotary hearth furnace, in which a content of total iron is 55 mass % or more, a metallization ratio of iron is 50 to 85%, particles of metal iron with an average 35 microns or less are coupled to form a metal iron network between the iron oxide and a mixture of the other oxides, and a porosity is 20 to 50%, is fed into a vertical furnace, in which an in-furnace space filling ratio of massive iron and massive coke is 80% or less, in a condition that a ratio of 5 to 20 mm is 80% or more, and is reduced and molten.

(13) In the method for producing pig iron according to the above (12), the reduced iron pellet may be reduced and molten in a condition that a ratio of the reduced iron pellet to the massive iron in the vertical furnace is 100% or less.

(14) In the method for producing pig iron according to the above (12), the reduced iron pellet may be fed into a position within ⅔ from the center in a diameter direction of the vertical furnace, so that a ratio of the reduced iron pellet in the iron producing blast furnace is 70% or more.

(15) In the method for producing pig iron according to the above (12), a reduced iron pellet produced by heating a powder formed article including at least one of zinc and lead, iron oxide, and carbon in a rotary hearth furnace, in which a total content of zinc and lead is 0.05% or more, may be fed into the vertical furnace in which a gas temperature of an upper part of the furnace is 500° C. or more, and is reduced and molten.

(16) According to the invention, there is provided another method for producing pig iron, wherein when a powder formed article including iron oxide and carbon is heated in a rotary hearth furnace, the reduced iron pellet produced by the method according to the above (1) in which a content of total iron is 55 mass % or more, a metallization ratio of iron is 50 to 85%, a metal iron network is formed between the iron oxide and a mixture of the other oxides, and a porosity is 20 to 50%, is fed into a vertical furnace, in which an in-furnace space filling ratio of massive iron and massive coke is 80% or less, in a condition that a ratio of 5 to 20 mm is 80% or more, and is reduced and molten.

Advantage of the Invention

According to the invention, iron oxide containing dust collected from iron oxide powder or iron producing equipment is appropriately reduced. A reduced iron pellet is supplied to a blast furnace, and thus it is possible to economically produce molten iron. In addition, even when a vertical furnace such as a cupola is used instead of the blast furnace, it is also possible to produce economically produce molten iron.

DESCRIPTION OF REFERENCE NUMERALS AND SIGNS

1: CEILING
2: SIDE WALL
3: WHEEL
4: HEARTH
5: RAIL
6: BURNER
11: BALL MILL
12: GRANULATION DEVICE
13: ROTARY FURNACE

14: EXHAUST GAS DUCT
15: BOILER
16: HEAT EXCHANGER
17: DUST COLLECTOR
18: CHIMNEY
21: FURNACE TOP
22: ORE LAYER
23: COKE LAYER
24: FURNACE CORE
25: TUYERE
26: TAPHOLE

DETAILED DESCRIPTION OF THE INVENTION

An embodiment of the method for producing a reduced iron pellet and the method for producing pig iron of the invention will be described hereinafter.

In the embodiment, powder including iron oxide and carbon is used as a raw material. As the iron oxide, any one of FeO (wustite), $Fe_3O_4$ (magnetite), and $Fe_2O_3$ (hematite), or a mixture thereof may be used. In addition, metal iron may be mixed. An iron oxide source is ore such as iron ore and iron sand, and iron oxide containing dust generated in steel works or the like. A carbon source is powder coke, powder coal, oil coke, and the like. In a reduction reaction, fixed carbon (FC) that is not volatilized at 1000° C. or more is contributed, and thus it is preferable that a ratio of the fixed carbon is high. From this viewpoint, powder coke, oil coke, anthracite, medium volatile coal, and the like are preferable. Dust including a large amount of carbon in an iron producing operation may be used.

In a raw material, impurities such as iron ore, iron oxide containing dust, coke, and coal are mixed. As them, there are metal oxide that is easily reduced such as nickel oxide, manganese oxide, chrome oxide, and zinc oxide; and metal oxide that is not easily reduced such as silicon oxide, calcium oxide, aluminum oxide, magnesium oxide, and titanium oxide. Powder total iron content ratio ((T.Fe) content ratio) is preferably 50% or more. When T.Fe is 50% or less, a metal iron ratio after reduction may be 55% or less. Accordingly, there is a problem that strength of the reduced iron pellet decreases. In addition, the T.Fe content ratio is a value obtained by the sum of an iron content in iron oxide and a metal iron amount by a total powder amount.

The powder of the raw material in which an average particle diameter of iron oxide is 50 micrometers or less is used. When the average particle diameter is 50 micrometers or more, matters in the particles slowly move and thus long time is necessary for reduction. Accordingly, particles of 50 micrometers or more are not preferable. To control porosity of the reduced iron pellet, fine particles are preferable, and particles with an average particle diameter of 25 micrometers or less are preferable as possible. In a granulation operation, as the particle diameter gets smaller, it is easier to produce a formed article. From this viewpoint, fine particles are preferable.

Raw materials are combined in a condition of a proper ratio of iron oxide and carbon in the raw materials. A reaction in the RHF is $MO+C=M+CO$ and $MO+CO=M+CO_2$. M is a symbol representing a metal element. A result obtained by studying a reaction in the RHF by the inventors is as described below. Metals such as iron oxide, nickel oxide, manganese oxide, chrome oxide, and zinc oxide reduced at 1200° C. by carbon monoxide are metallized in the RHF. A metallization ratio thereof is determined by operation conditions of the RHF. Metals such as silicon oxide, calcium oxide, aluminum oxide, magnesium oxide, and titanium oxide that are not metallized at 1200° C. by carbon monoxide are not reduced in the RHF and remain as oxides.

A carbon combination amount is determined by a ratio of oxygen (hereinafter, referred to as active oxygen) combined with metals such as iron oxide, nickel oxide, manganese oxide, chrome oxide, and zinc oxide that are easily reduced. Since a reduction reaction of iron oxide and the like occurs at the time point over about 1000° C., carbon contributed to the reduction reaction is fixed carbon. Accordingly, when a ratio of the active oxygen and the fixed carbon is controlled, it was founded that a satisfactory reaction can occur in the RHF. The condition is that a ratio (C/O) of an atom mole amount of fixed carbon to an atom mole amount of active oxygen is 0.7 to 1.5. When the C/O is 0.7 or less, reduction is insufficient in the RHF irrespective of the reduction condition in the RHF. Accordingly, in many cases, a metallization ratio of iron is 50% or less, and a part of iron oxide remains as ferric oxide. In a carbon excess state, a large amount of carbon remains in a reduced iron pellet after reduction. When the C/O is 1.5 or more, residual carbon is 2 mass % or more. Accordingly, there is a problem that crushing strength of the reduced iron pellet decreases.

A method for reducing the raw powder by the RHF will be described with reference to FIG. 1 and FIG. 2. First, the raw powder is mixed in a mixer (ball mill 11 in FIG. 2), and then the mixture is formed into a formed article in a granulation device 12. The mixer is not limited to a ball mill, and may be means such as a kneader type, a fluidized bed type, and an underwater mixing type. The granulation device may be a disk type granulation device, a roller type compression forming device, an extracting type forming device, and the like. The formed article is uniformly laid on a hearth 4 of a rotary furnace 13 to be filled. The number of layers of the formed article on the hearth 4 is preferably 2 or less. This is a condition to make heat transmission satisfactory. A size of the formed article is preferably an average diameter of 8 to 25 millimeters in a spherical shape, and is preferably an average conversion diameter of 7 to 30 millimeters in the other shape. When the size is too small, a thickness of the formed article on the hearth 4 becomes too small and thus productivity decreases. When the size is too large, heat transmission in the formed article deteriorates. In the rotary furnace 13, the formed article is moved from a heating zone in the furnace to a reduction zone by rotation of the hearth 4. The formed article is heated at 1200 to 1400° C. by radiation in the reduction zone by radiation of high temperature gas, and carbon and metal oxide react in the formed article, thereby producing reduced iron. A sojourn time of the formed article in the furnace is 10 to 25 minutes, and a reduction time except the heating time up to 1000° C. is about 5 to 20 minutes. The conversion diameter is represented by ⅓ multiplication of volume.

A heating rate of the formed article is 400° C./min or less at the center, and preferably 300° C./min or less. For this condition, an average gas temperature of the heating zone is preferably 1200° C. or less. When the hating rate is too high, a large declination occurs in temperature of the center and the outer periphery. A temperature of the outer periphery is higher than 1000° C., a reduction reaction occurs at that part. When difference in temperature between the center and the outer periphery is large, a reaction of the center does not substantially proceed even when the reaction of the outer periphery is substantially completed. Then, the reduction of the center proceeds. At that time, a reduction completed layer that allows gas to hardly pass is formed in the outer periphery, and thus passing resistance of gas becomes high by the reduction of the center. As a result, there is a problem that a defect occurs such as a crack occurring in the outer periphery. When a heating rate of the formed article is 100° C./min or less, productivity of the RHF remarkably decreases. Accordingly, the heating rate of the formed article is 100° C./min or more, and preferably 150° C./min or more.

In the reduced iron pellet produced by this reaction, a reduction ratio (oxygen removal ratio of reduced metal) is 65 to 90%, and a metallization ratio of iron is 50 to 85%. In this case, a reduced iron pellet having a porosity of 20 to 50%, and preferably 20 to 45% is produced. As the formed article that is a raw material, a formed article having a porosity of 27 to 55% is used. However, when oxygen of iron oxide and carbon is removed in the reaction, air gaps in the formed article increases and thus a porosity of the reduced iron pellet increases to 50 to 70% in this state. Simply, the process in this state is completed, crushing strength of the reduced iron pellet becomes 1 MPa (10 kg-f/cm$^2$) or less. In this crushing strength, when the reduced iron pellet is fed into a blast furnace or a vertical furnace, the reduced iron pellet is easily powdered and thus ventilation of gas in the furnace deteriorates.

Accordingly, in the furnace of the RHF, the oxide and the metal iron in the reduced iron pellet are sintered, thereby increasing a porosity of the reduced iron pellet. Three conditions for this are that a reduction temperature is 1200° C. or more, a metal iron ratio of the reduced iron pellet is 50% or more, and residual carbon is 2 mass % or less. To secure a sintering time, a sojourn time at a temperature of the formed article of 1200° C. or more in the furnace is 8 minutes or more. In the conditions, it is possible to produce a reduced iron pellet having a porosity of 50% or less. When the reduction temperature is 1400° C. or more, the carbon and metal iron in the reduced iron pellet react to fog n cementite. Since the cementite has a low melting point, the metal iron and the oxide are physically separated by melting the cementite. For this reason, it is difficult to form a network of proper metal iron particles, and thus crushing strength of the reduced iron pellet decreases. Accordingly, the reduction temperature is preferably 1200 to 1400° C. In this condition, it is possible to produce a reduced iron pellet having a porosity of 50% or less. In this condition, crushing strength of the reduced iron pellet is 5 MPa or more and thus it is possible to use it in a blast furnace or a vertical furnace. The porosity is calculated from a ratio of a true specific gravity and an appearance specific gravity of materials included in the reduced iron pellet. The porosity is represented by (porosity)=100−((appearance specific gravity)/(true specific gravity)×100(%)). The appearance specific gravity is a value obtained by mass of the reduced iron pellet by volume.

The reduced iron pellet produced by the method of the invention has a structure of forming a metal iron particle network between mixtures of iron oxide and the other oxide. It is important that a small amount of iron oxide remains and carbon in the formed article does not remain. Accordingly, the method of the invention has an operational characteristic that a reduction ratio is not extremely raised, as compared with the known method. For this reason, an atmosphere of the reduction zone in the RHF is a low reduction property. When the atmosphere is a high reduction property, a reaction of carbon monoxide and iron oxide in gas proceeds in addition to the reduction of carbon and iron oxide, and thus carbon easily remains in the reduced iron pellet. In this case, cementite is formed, a melting point of metal iron decreases, a metal iron particle network is not formed, and thus crushing strength of the reduced iron pellet decreases. In addition, the metal iron particle network means that metal iron particles from several micrometers to about 35 micrometers and generated by reduction are coupled to form a three-dimensional network.

In experiment of the inventors, a ratio (CO/CO$_2$ ratio) of carbon monoxide to carbon dioxide in gas of the reduction zone is 1 or less, and preferably 0.8 or less. When the CO/CO$_2$ ratio is 0.3 or less, reduction of iron oxide does not normally proceed. Herein, the reduction zone is a position in the furnace where a center temperature of the reduced iron pellet is 1000° C. or more. A gas ingredient is defined as an average value in a space of the furnace of 300 mm or more from the formed article. A position of 300 mm or less from the formed article is influenced by carbon monoxide generated by the reduction reaction of iron oxide, and thus there is declination from the composition of the whole gas. Accordingly, the gas composition at this part deviates from the definition of the gas composition of the invention.

The type of oxide remaining in the reduced iron pellet has an effect on strength and porosity of the reduced iron pellet. When a melting point of the oxide is low and the oxide is molten or softened in the furnace, particles of the oxide in the reduced iron pellet after cooling are coarsened. As a result, the reduced iron particle network and the oxide are separated, and thus the whole coupling state of the reduced iron pellet deteriorates. As a result, there is a problem that strength of the reduced iron pellet decreases. In an extreme case, pores are blocked by the molten oxide. In the invention, the size of the oxide particles is controlled in the range of 5 to 100 microns. In the case of 5 microns or less, since the size is smaller than the air gap of the metal iron particle network, and thus the structure is not dense. In the case of 100 microns or more, the metal iron particle network is input to the inside of the coarse oxide particles, and thus strength of the reduced iron pellet decreases. Herein, the size of the oxide means this size in case of independent existence, and means a particle diameter in case of a sintered material.

To make the size of the oxide particles appropriate by preventing this phenomenon, a chemical composition of a raw material that does not generate an oxide compound with a low melting point is preferable. In the oxide with a low melting point, impurities may be mixed with calcium ferrite or calcium silicate. Studying a raw material chemical composition that does not generate them, it has been founded that it is preferable to control a ratio of calcium oxide and iron oxide, a ratio of calcium oxide and silicon oxide. In addition, it has been cleared that magnesium oxide suppresses generation of calcium ferrite or calcium silicate. From an experiment, it has been cleared that a mass ratio of calcium oxide to silicon oxide is preferably 2.2 or less, as a condition that oxide is not molten or softened at 1200 to 1400°. For more improvement, $\{(\text{CaO mass \%})-(\text{MgO mass \%})\}/(\text{T.Fe mass \%})<0.1$ and $\{(\text{CaO mass \%})-(\text{MgO mass \%})\}/(\text{SiO}_2 \text{ mass \%})<2.0$ are required. Since fluorine and chloride are elements decreasing a melting point of oxide, (F mass %)+0.4(Cl mass %)<0.25% is preferable. A coefficient relating to chloride concentration is to consider an effect relating to softening and atomic weight difference of chloride. Particularly, when iron producing dust or the like is recycled, important means is to limit a composition of oxide.

A porosity of the reduced iron pellet of 20% or more is necessary to improve a reduction rate of the reduced iron pellet. This is to promote a final reduction of the reduced iron pellet by diffusing and infiltrating reduction gas through air gap, when the reduced iron pellet is reduced in a blast furnace or a vertical furnace. To satisfy this porosity, a reduction temperature is 1400° C. or less, residual carbon is 2 mass % or less, and a sojourn time at 1200° C. or more is a time represented by to=69.5−0.035 T or less. Herein, T denotes an average gas temperature (° C.) at the inside of the furnace at 1200° C. or more, and to denotes a sojourn time (minute) in the longest furnace. The to is 27.5 minutes at 1200° C., 24.0 minutes at 1300° C., and 20.5 minutes at 1400° C. In these conditions, excessive sintering is prevented, and thus it is possible to keep a porosity at 20% or more. As a result, the reduced iron pellet is contracted for sintering, and has a conversion diameter of 5 to 20 millimeters. The reduced iron pellet includes a small amount of metal iron particles of 5 millimeters or less by the phenomenon such as cracks of the formed article.

The reduced iron pellet produced in the aforementioned conditions is cooled. Consideration at the cooling is re-oxidation of the reduced iron pellet. To prevent the re-oxidation, at 300° C. or more, it is preferable to cool the reduced iron pellet in gas of a low oxidation atmosphere with an oxygen concentration of 5 volume % or less. As a cooling device, a drum type external water cooler is proper. A ratio of ferric oxide in the reduced iron pellet of a normal temperature after the cooling is made 5 mass % or less. The reason of restricting the ratio of the ferric oxide is that it is powdered in the blast furnace at the time of reducing, thereby decreasing strength of the reduced iron pellet.

Figure 3:
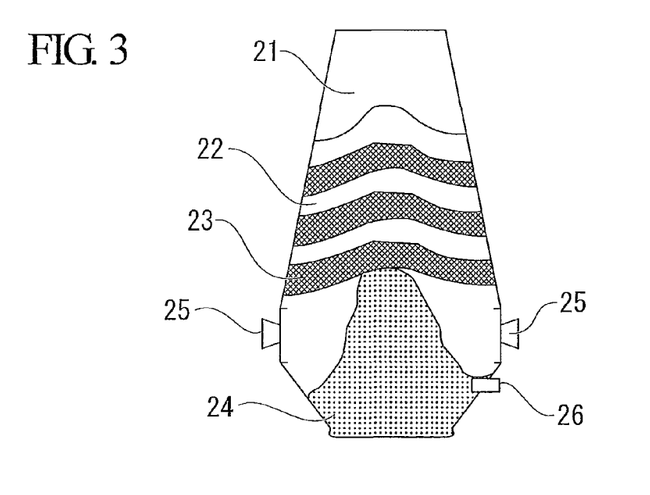
FIG. 3 is a diagram illustrating an internal structure of a blast furnace.

The above-described reduced iron pellet is reduced and molten in the blast furnace. A schematic structure of the blast furnace is shown in FIG. 3. Metallurgy coke and iron sources such as and massive ore, sintered ore, and burning pellets, and the reduced iron pellet of the invention as raw materials of the blast furnace are supplied to a hearth 21 in the blast furnace through bell formed at an upper portion of the furnace. The reduced iron pellet is input together with ore, sintered ore, and the like to form an ore layer 22. The massive coke is independently input to form a coke layer 23. Hot blast of 1100 to 1200° C. and dust coal are blown in from a tuyere 25 to cause a reaction in the furnace. Theses raw materials react, descend in the furnace, become molten iron and molten slag in the vicinity of a furnace core 24, and are collected at the lower part of the furnace. Then, it is discharged from a taphole 26. As described above, in the reduced iron pellet supplied to the blast furnace, a metallization ratio of iron is 50 to 85%, the reduced iron pellet with a conversion diameter of 5 to 20 millimeters is 80% or more, and a porosity is 20 to 50%. Crushing strength of the reduced iron pellet is preferably 5 MPa or more. When usage of the reduced iron pellet in the blast furnace is little, a reduction delay problem is not disclosed. Accordingly, the advantage of the invention is remarkable when usage of the reduced iron pellet is 40 kg/t or more per hot metal productivity.

The conditions that the reduced iron pellets with the conversion diameter of 5 to 20 millimeters are 80% or more and a porosity is 20 to 50% are determined by a reduction reaction in the blast furnace and a characteristic of heat transmission. Since the reduced iron pellet produced in the RHF has a metallization ratio of 50 to 85%, a large amount of iron oxide is included therein. Accordingly, when gas reduction in the blast furnace to the middle part of a blast furnace shaft is insufficient, iron oxide remains even at the lower part of the furnace, and thus direct reduction occurs by coke in a slag. As a result, a temperature of the slag decreases by heat absorption of the reduction reaction, and thus it is difficult to discharge the slag from the blast furnace. Desulfuration ability of the slag decreases for increase of FeO in the slag, and thus sulfur concentration of pig iron increases.

The size of the reduced iron pellet is preferably 20 millimeters or less from the producing condition in the RHF, and is preferably 5 millimeters or more from the viewpoint that gas flow in the blast furnace is not scattered. In the experiment of the inventors, when the reduced iron pellet of 5 millimeters or less is 10 to 15% or more, it has been found that gas pressure loss in the blast furnace increases. Accordingly, the reduced iron pellet with a conversion diameter of 5 millimeters or less is fed into the blast furnace together with the other materials, gas passage pressure loss of the filler increases, and thus there is a problem that blast volume in the furnace decreases. When this phenomenon occurs, productivity (taphole ratio (t/day)) of the blast furnace decreases. When the amount of the reduced iron pellets of 20 millimeters or more increase, FeO in the slag caused by delay of heat transmission may increase even when a reduction condition is good. In addition, since there is non-uniformity in size of the reduced iron pellets, a ratio of the reduced iron pellets of 5 to 20 millimeters is preferably 80% or more in real management of granularity.

Figure 4:
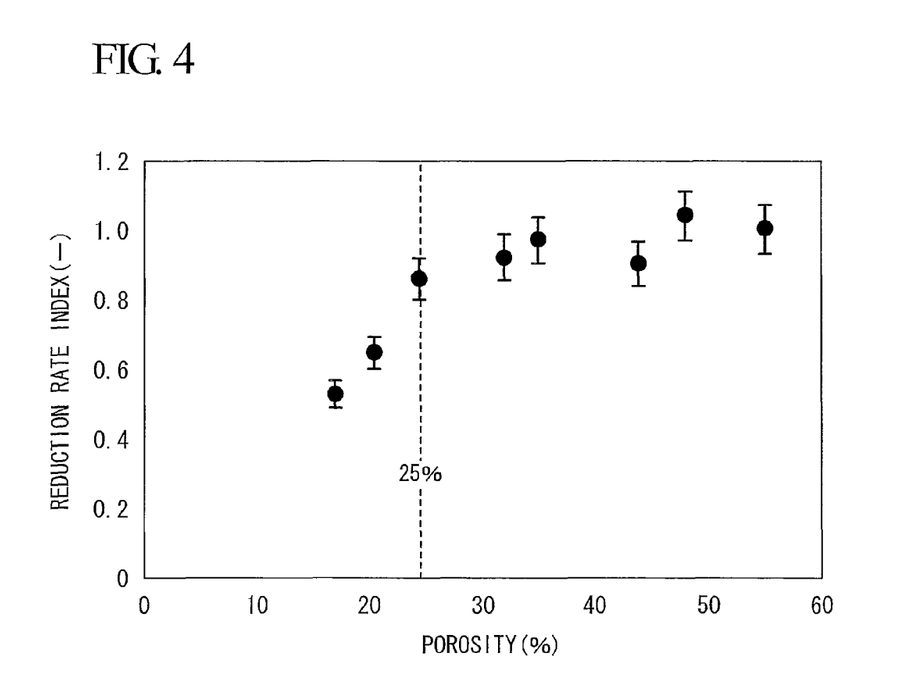
FIG. 4 is a diagram illustrating a result obtained by measuring a reduction ratio of iron oxide in a reduced iron pellet in an atmosphere of carbon monoxide at 1100° C. in a column type reactor, and is a graph illustrating relation between an index (correcting a diameter of a reduced iron pellet and a reduction degree) of a reaction rate and a porosity of a reduced iron pellet (a reduction rate of a porosity 55% is 1).

The inventors examined factors having an effect on gas diffusion in the reduced iron pellet from viewpoint that it is important to diffuse reduction gas in the reduced iron pellet, to reduce residual iron in the reduced iron pellet. Factors having the best effect are an inner porosity and a size. As for size, a reduction experiment was carried out in a reaction column using the reduced iron pellet in the range of 5 to 20 millimeters of a diameter that is a restriction item about heat transmission. The experiment was to measure a reduction rate in an atmosphere of carbon monoxide at 1100° C. A result of the experiment is shown in FIG. 4 by relation between a reduction reaction rate index (diameters of the reduced iron pellets are corrected into index) and a porosity of the reduced iron pellet. In addition, the diagram is represented by an index where data of a porosity of 55% is 1. When the index is 0.6 or more, reduction in the blast furnace proceeds in a sufficient rate and thus a reduction delay phenomenon does not occur. Accordingly, a porosity is preferably 20% or more. As shown in the figure, it was cleared that when a porosity is 25% or more, a reduction reaction rate is stabilized at high level.

In the reduced iron pellet having a diameter of 5 to 20 millimeters and a metallization ratio of 50 to 85% with a porosity of 20% or more, gas diffusion of carbon monoxide in the reduced iron pellet rapidly proceeds, and the metallization of iron oxide is substantially completed up to a melting zone formed at the lower part of the blast furnace shaft. When an average diameter of oxide including iron oxide in an inner structure is 5 to 100 microns, strength of the reduced iron pellet is sufficient and it is possible to raise a reduction rate. That is, when particles are 100 microns or less, diffusion in particles is rapid and thus it is possible to perform rapid reduction. When particles are 5 microns or less, strength of the reduced iron pellet may decrease, which is not preferable. For this reason, burn-through of the reduced iron pellet in the melting zone becomes rapid, gas pressure loss at this part is reduced, and thus gas flow in the furnace is improved. As described above, the upper limit of the porosity is determined by the lower limit of the strength of the reduced iron pellet, and is 50% in the invention.

Since iron oxide remains in the reduced iron pellet produced in the RHF, another problem occurs. When the reduced iron pellet includes ferric oxide, crystal expansion occurs in the reduction process and thus there is a problem that the reduced iron pellet is broken down. Accordingly, it is necessary to lower a ratio of ferric oxide. When the ratio is 5 mass % or less, this phenomenon does not occur. To manage the ratio of ferric oxide, it is important to make a reduction condition satisfactory and to prevent re-oxidation of the reduced iron pellet during cooling and keeping. In the reduction condition, C/O is 0.7 or more, and a temperature of 1200° C. or more in the RHF is kept for 7 minutes or more. In cooling, it is necessary that oxygen concentration in a state of the reduced iron pellet of 300° C. or more be 5 volume % or less. In addition, re-oxidation is prevented by appropriately controlling a keeping period.

The inventors carried out the above-described technique in a blast furnace with 4800 cubic meters. Up to a range of 100 kg/t of the reduced iron pellet, there was an effect of decrease of a reductant (coke+dust coal) ratio or more according to a calculation value of decrease in thermal load by a reduction degree of the reduced iron pellet. In 100 to 250 kg/t, reduction and melting of the reduced iron pellet smoothly proceeded, but a thermal effect was relatively smaller than a calculation value. As described above, when the amount of the reduced iron pellet increases, the thermal effect tends to decrease. The reason may be that when the ratio of the reduced iron pellet in the furnace is too high, a contact state of gas and ore is changed and thus a gas usage ratio is changed. This phenomenon is prevented by inputting the reduced iron pellet of 65% or more to a position (area ratio of 44%) within ⅔ from the center in a diameter direction of an iron producing blast furnace. When the reduced iron pellet of 100 kg/t or more is used, this method is particularly effective. Up to the maximum 250 kg/t, it is possible to perform an operation at a reductant ratio equal to or less than a ratio of a reductant (coke+dust coal) according to a calculation value of decrease in themial load of using metal oxide or iron oxide (FeO) having a low oxidation degree.

As described above, when a large amount of reduced iron pellets is fed into an outer peripheral side of the blast furnace, a descending rate of an outer peripheral filler (padding) becomes too high since a reducing and melting rate of the reduced iron pellet is higher than that of ore or the like. As a result, the slowly reduced outer peripheral ore reaches a lower part of the furnace in a state of non-reduction, and thus there is a problem that the lower part of the furnace is excessively cooled. When a large amount of reduced iron pellets is supplied to the center, gas flow at the center of the furnace is promoted and the descending of the filler is promoted. The reason is that gas pressure loss of the filler can be prevented from increasing and the descending rate of the reduced iron pellet is higher than that of ore or the like, since the reduced iron pellet is not reduced and powdered. As a result, gas flow at the center is promoted and it is possible to increase blast volume. In addition, the filler at the center is reduced for a short time. Therefore, the ratio of the reductant is further reduced, and it is possible to improve productivity (production t/d) of pig iron.

In the invention, the produced reduced iron pellet is fed into a vertical furnace such as a cupola, thereby producing molten iron. Also in this case, a technique similar to the technique in the blast furnace is used. The vertical furnace is a sake-bottle shaped furnace having an upper shaft with a taper attached thereunder and a furnace lower portion for collecting a molten material, and has a vertical shaft furnace structure similar to the blast furnace. A ratio of a height and a maximum diameter is about 4:1 to 8:1. Massive coke and massive iron such as a scrap and mold pig iron are fed into the furnace. In this case, the reduced iron pellets produced in the RHF are input together with the scrap and the like. Normal temperature air or heated air of 200 to 600° C. are blown from a tuyere provided on the side wall of the furnace lower portion, and the coke is burned to melt the scrap and the like and to finally reduce and melt the reduced iron pellet. In addition, the blown air may be oxygen-enriched. When the tuyere is formed of two up and down stages, it is possible to promote the burning of the coke.

As a condition of effectively using the reduced iron pellet in the vertical furnace, a space ratio (filling ratio) for filling the furnace with the massive iron and the massive coke is preferably 80% or less. A reduced iron pellet smaller than the massive coke or the massive iron is input between the massive coke and the massive iron. Accordingly, at a filling ratio more than that, a space for passing gas gets smaller, and thus it is difficult to discharge the gas. As the more satisfactory condition, an in-furnace filling ratio is preferably 65% or more. To secure ventilation between fillers of gas and to satisfy a condition that non-reduced iron oxide is not input to a slag, a mass ratio of the reduced iron pellet to the massive iron in the vertical furnace is preferably 100% or less. When a supply ration of the reduced iron pellet to a position within ⅔ from the center is 70% or more, reduction and melting of the reduced iron pellet are promoted. Particularly, when a mass ratio of the reduced iron pellet to the massive iron is 50 to 100%, the effect is excellent.

In the vertical furnace, a temperature of the uppermost portion (furnace top) of the in-furnace filler is relatively raised. In this condition, heating is started just before the reduced iron pellet is fed into the furnace, and thus a sojourn time of the reduced iron pellet in the furnace can be relatively reduced. In the vertical furnace of the furnace top temperature of 500° C. or more, an in-furnace time of the reduced iron pellet can be the minimum 20 minutes. Even when the sojourn time is too long, there is no advantage. Economically, the maximum is preferably 2 hours.

In the vertical furnace, another advantage to raise the furnace top temperature is that it is possible to use a raw material including a volatile material such as zinc and lead. Metallized zinc and lead are vaporized at about 1000° C. or more. The vapor is re-condensed in a form of oxide or chloride at 500 to 800° C. Accordingly, in the operation of metallizing and vaporizing zinc and lead in the vertical furnace, when the in-furnace top temperature is low, these metals are re-condensed in the vicinity of the filler. The re-condensed material (zinc oxide, zinc chloride) may be attached to a furnace wall. As a result, the inside of the furnace at this part becomes narrow, and thus there is a problem that productivity of the vertical furnace decreases. In the study of the inventors, when the furnace top temperature is 500° C. or more, most of vaporization water is discharged out of the furnace together with gas, and an attachment material of the furnace wall hardly occurs. Accordingly, in the RHF, a powder formed article including iron oxide and carbon and including any one of zinc and lead is heated, thereby removing a part of zinc and lead. Then, a reduced iron pellet in which a total content of zinc and lead is 0.1% or more is produced. In this concentration of zinc and lead, a large amount of zinc is generated from the vertical furnace. In a general operation, the concentration is a condition for forming an in-furnace attachment. The reduced iron pellet is fed into a vertical furnace in a state where a gas temperature of the furnace upper part is 500° C. or more. Therefore, it is possible to produce a molten iron using powder having a high content ratio of zinc and lead as a raw material by this method.

In the case of carrying out the invention, in the RHF, it is preferable that a reduced iron containing material in which a metallization ratio of iron is 50 to 85% is produced, and then a hot formed reduced iron pellet is reduced and molten in a blast furnace. The RHF is a process capable of reducing iron oxide for a short time because a reduction rate thereof is high. However, as described in Paragraph [0005] of Background Art, as a property of the process, mixing is performed at a ratio in which carbon dioxide is in an in-furnace atmosphere gas. As a result, to perform high reduction of 85% or more as a metallization ratio of iron, it is necessary that the in-furnace temperature is 1400° C. or more and residual carbon in the reduced iron containing material after reaction is 5 mass % or more. To improve the metallization ratio of iron to 80% to 90%, energy consumption increases by 30%, and thus it is difficult to perform an economical operation. Accordingly, the metallization ratio of iron is 85% or less, and preferably 80% or less for economical efficiency of heat. The reason that the lower limit of the metallization ratio of iron is 50% is that it is difficult to produce a high strength reduced iron pellet at a metallization ratio less than that. In the study of the invention, in the RHF, the reduced iron containing material with a metallization ratio of 50 to 85% is produced, and energy consumption for reducing and melting the material is lower than energy consumption for producing pig iron with combination of sintering equipment and a blast furnace. Accordingly, economical efficiency was clearly achieved.

Example

According to the method of the invention, a reduction forming processing of iron oxide was carried out using the RHF equipment shown in FIG. 2. The RHF has a hearth outer diameter of 24 meters, and a process ability of 24 ton/hour. The reduced iron pellets produced by the equipment were supplied to a blast furnace of 4800 cubic meters or a cupola having a height of 10 m and an inner diameter of 2.2 m, thereby obtaining an operation result. The used raw materials are shown in Table 1, and the operation result is shown in Tables 2 to 4.

The raw materials are six kinds shown in Table 1, and Raw Material 1 is iron oxide containing dust generated in steel producing works and powder coke. Raw Material 2 is a mixture of hematite ore and anthracite. Raw Material 3 is a mixture of magnetite ore and anthracite. All conditions of C/O were within the scope of the invention. Raw Material 4 is a material formed of iron oxide containing dust in steel producing works and powder coke. Content ratios of zinc and lead were 2.1 mass % and 0.7 mass %, respectively. Raw Material 5 is a material formed of iron oxide containing dust and powder coke, and has a small diameter. Raw Material 6 is a material formed of iron oxide containing dust and powder coke, and has a relatively large amount of calcium oxide or the like.

A result obtained by reducing the aforementioned materials in the RHF is shown in Table 2. RHF1, RHF3, RHF4, and RHF5 represent an average value of the result of the process in a preferable condition of the invention. In these levels, all of metallization ratio, porosity, and crushing strength fall within the usage condition in which a blast furnace and a vertical furnace in the invention are optimal. An average conversion diameter is 11 to 16 millimeters, and a ratio of a conversion diameter of 5 to 20 millimeters was in the range of 83 to 96%. In the level of RHF5, a part of zinc and lead of the raw materials were removed, and thus content ratios thereof were 0.18 mass % and 0.07 mass %, respectively. In the level of RHF6, since a particle diameter of Raw Material 5 was small, a porosity was relatively high as 40%, but a crushing strength was very satisfactory as 15.3 MPa.

In the level of RHF2, an example of an operation is shown in which a sojourn time of a formed article at a part of 1200° C. or more is longer than to. In this level, a formed article having a large diameter was used. However, sintering was sufficient, and a crushing strength was very satisfactory as 19.6 MPa. Since a sojourn time of the formed article was too long at a part of 1200° C. or more, a porosity was 22%. In the viewpoint of strength, it is possible to supply the formed article to a blast furnace, and there is no problem in a small amount of several kg per pig iron. However, since the porosity is low, in the case of a large amount, a problem may occur in reduction property in a blast furnace.

In the level of RHF7, since a ratio of calcium oxide of the raw materials was high, $\{(CaO)-(MgO)\}/(T.Fe)$ was 0.12, and $\{(CaO)-(MgO)\}/(SiO_2)$ was 2.7. As a result, a crushing strength was lowered to 5.9 MPa. In the level of RHF8, a porosity was satisfactory, but a heating rate was high. Accordingly, a crushing strength was lowered to 5.1 MPa. In the level of RHF9, since a ratio of $CO/CO_2$ in a reduction zone was 1 or more, a porosity was 50% or more, and a crushing strength was lowered to 3.6 MPa. The strength was insufficient for using in a shaft furnace such as a blast furnace.

TABLE 1

Raw Material Condition

| | T·Fe % | Fe Oxidation O/Fe Ratio | MnO % | NiO2 % | FC % | C/O % | CaO % | SiO2 % | MgO % | F % | Cl % | Average Particle Diameter μ |
|---|---|---|---|---|---|---|---|---|---|---|---|---|
| Raw Material1 | 49.2 | 1.11 | 0.75 | — | 15.0 | 1.28 | 3.8 | 2.1 | 0.3 | 0.08 | 0.15 | 52 |
| Raw Material2 | 56.7 | 1.42 | 0.11 | 0.08 | 13.9 | 0.80 | 0.8 | 3.7 | 0.1 | 0.01 | 0.09 | 38 |
| Raw Material3 | 60.2 | 1.33 | 0.12 | 0.05 | 15.8 | 0.92 | 0.9 | 4.9 | 0.3 | 0.02 | 0.11 | 68 |
| Raw Material4 | 48.8 | 1.21 | 0.11 | 2.3 | 16.2 | 1.22 | 4.9 | 2.5 | 1.1 | 0.11 | 0.09 | 24 |
| Raw Material5 | 52.3 | 1.19 | 0.10 | — | 13.1 | 0.98 | 4.8 | 1.9 | 1.2 | 0.11 | 0.08 | 16 |
| Raw Material6 | 50.8 | 1.08 | 0.15 | — | 9.9 | 0.84 | 6.9 | 2.3 | 0.7 | 0.15 | 0.11 | 19 |

TABLE 2

RHF Reduction Condition

| Level Name | Raw Material | Total time Minute | Heating Rate °C./min | 1200° C. or more time minute | Reduction Temp. °C. | Reduction zone CO/CO2 Ratio °C. | Metallization Ratio % | Metal Iron Ratio % | C Residual Ratio % | Fe2O3 Ratio % | Porosity % | Crushing Strength MPa | Average conversion diameter mm |
|---|---|---|---|---|---|---|---|---|---|---|---|---|---|
| RHF1 | Raw Material1 | 12 | 330 | 9 | 1250 | 0.55 | 68 | 50 | 1.1 | 2.7 | 43 | 6.8 | 12 |
| RHF2 | Raw Material1 | 30 | 240 | 26 | 1300 | 0.68 | 77 | 57 | 0.9 | 2.2 | 22 | 19.6 | 16 |
| RHF3 | Raw Material2 | 18 | 380 | 15 | 1350 | 0.78 | 80 | 71 | 0.3 | 3.0 | 30 | 12.2 | 13 |
| RHF4 | Raw Material3 | 20 | 320 | 17 | 1400 | 0.93 | 82 | 77 | 0.2 | 1.3 | 26 | 12.9 | 11 |
| RHF5 | Raw Material4 | 15 | 260 | 11 | 1300 | 0.46 | 69 | 53 | 0.8 | 1.1 | 38 | 8.8 | 12 |
| RHF6 | Raw Material5 | 20 | 250 | 16 | 1350 | 0.72 | 71 | 52 | 0.3 | 2.3 | 40 | 15.3 | 14 |
| RHF7 | Raw Material6 | 20 | 250 | 16 | 1350 | 0.71 | 78 | 56 | 1.6 | 2.2 | 47 | 5.9 | 15 |
| RHF8 | Raw Material1 | 12 | 420 | 10 | 1250 | 0.77 | 69 | 51 | 1.1 | 2.6 | 39 | 5.1 | 12 |
| RHF9 | Raw Material1 | 12 | 330 | 9 | 1250 | 1.22 | 78 | 55 | 2.3 | 1.3 | 53 | 3.6 | 14 |

A result obtained by using the reduced iron pellets shown in Table 2 in a blast furnace is shown in Table 3. The level of Blast Furnace 1 is an operation result in a condition (comparison condition) where the reduced iron pellet is not used. The levels of Blast Furnace 1 to Blast Furnace 4 are results using raw materials satisfying the conditions of the invention. In all results, a decrease ratio of reductant per metal iron was a satisfactory value as 0.43 to 0.45 kg/kg. Also, increase of a producing amount of pig iron was satisfactory as 7.7 to 9.1 t-hm/d/kg per metal iron. Even in the case of the condition of Blast Furnace 4 having a high input ratio of the reduced iron pellets, since an input ratio at a position within ⅔ from the center of the blast furnace was 75%, all effects of reductant decrease ratio iron producing amount were satisfactory. Meanwhile, in the level of Blast Furnace 5 using reduced iron pellets having a low porosity as Comparative Example, reductant decrease ratio and pig iron productivity increase ratios per metal iron were lower than that of the other level. Increase of FeO in a slag was recognized. As described above, in the reduced iron pellet having a low porosity, a satisfactory operation result could not be obtained.

A result obtained by using the reduced iron pellets shown in Table 2 in a vertical furnace is shown in Table 4. The level of Vertical Furnace 1 is an operation result in a condition (comparison condition) where the reduced iron pellet is not used. The levels of Vertical Furnace 1 to Vertical Furnace 4 are results using raw materials satisfying the conditions of the invention. In these operations, smooth reduction and melting are performed, and thus productivity was satisfactory. As an index for checking whether the reduction of the reduced iron pellet smoothly proceeds, a ratio of FeO in a slag was compared. In all the levels of Vertical Furnace 2 to Vertical Furnace 4, FeO was low as 2% or less. The reason is that the reduced iron pellet is sufficiently reduced in a shaft of the vertical furnace. The reduced iron pellet including a total content of zinc and lead of 0.25 mass % was used. However, since a furnace top temperature was high as 565° C., there is no trouble in operation. In the level of Vertical Furnace 6 as Comparative Example, productivity was slightly deteriorated, and FeO in a slag was increased as 5.9 mass %. This suggests that the reduction of the reduced iron pellet was not sufficiently performed.

TABLE 3

Blast Furnace Operation Result

| Level Name | Input DRI Type | DRI Metal Iron Ratio % | DRI Ratio kg/t-hm | Furnace Center 2/3 Ratio % | Reduction Ratio kg/t-hm | Decrease | Reductant Decrease per Metal Iron kg/kg | Pig Iron Production t-hm/d | Increase | Increase in Production per Metal Iron (t-hm/d)/kg |
|---|---|---|---|---|---|---|---|---|---|---|
| Blast Furnace1 | — | — | 0 | — | 510 | | | 10,058 | | |
| Blast Furnace2 | RHF1 | 50 | 45 | 50 | 500 | 10 | 0.45 | 10,232 | 174 | 7.7 |
| Blast Furnace3 | RHF3 | 71 | 100 | 70 | 479 | 31 | 0.44 | 10,659 | 601 | 8.6 |
| Blast Furnace4 | RHF4 | 77 | 220 | 75 | 438 | 72 | 0.43 | 11,556 | 1,498 | 9.1 |
| Blast Furnace5 | RHF2 | 57 | 100 | 70 | 482 | 18 | 0.31 | 10,472 | 414 | 5.9 |

TABLE 4

Vertical Furnace Operation Result

| Level Name | Input DRI Type | DRI Metal Iron Ratio % | DRI Ratio of Massive Iron % | Furnace Center 2/3 Supply Ratio % | Furnace Top Temp. °C. | Sojourn Time in DRI Furnace Minute | Productivity t/d | FeO in Slag % |
|---|---|---|---|---|---|---|---|---|
| Vertical Furnace1 | | | — | — | 290 | | 683 | 0.9 |
| Vertical Furnace2 | RHF1 | 50 | 25 | 45 | 300 | 88 | 628 | 1.4 |
| Blast Furnace3 | RHF3 | 71 | 52 | 65 | 325 | 55 | 587 | 1.7 |
| Blast Furnace4 | RHF4 | 77 | 90 | 80 | 550 | 27 | 601 | 1.9 |
| Blast Furnace5 | RHF5 | 53 | 50 | 75 | 565 | 31 | 595 | 0.9 |
| Blast Furnace6 | RHF2 | 57 | 50 | 65 | 320 | 56 | 557 | 5.9 |

INDUSTRIAL APPLICABILITY

The invention can be used for an operation for producing pig iron by combining a rotary hearth furnace and an iron producing blast furnace or a vertical melting furnace. In addition, the invention can be used for an operation for producing pig iron by reducing scales or iron oxide containing dust generated in steel works or steel processing factories, or the like.

The invention claimed is:

1. A method for producing a reduced iron pellet, the method comprising
producing the reduced iron pellet by heating and reducing a powder formed article including iron oxide and carbon in a rotary hearth furnace, wherein
a formed article, produced using a raw material in which an average diameter of the iron oxide is 25 microns or less, a ratio of carbon monoxide to carbon dioxide in a reduction zone is from 0.3 to 1, and a ratio of an atom mole amount of fixed carbon to an atom mole amount of active oxygen is 0.7 to 1.5, is reduced at a temperature of 1400° C. or less, and
a reduced iron pellet is produced in which a ratio of metallic iron to total iron is 50 to 85% and a content of residual carbon is 2% or less.

2. The method for producing a reduced iron pellet according to claim 1, wherein
a sojourn time is within a range between a fixed lower limit of 8 minutes and a variable upper limit represented by an equation "to=69.5-0.035T", where a unit of the variable upper limit "to" is minutes, and T is an average gas temperature (° C.) in the rotary hearth furnace within a process temperature limit between 1200° C. and 1400° C.

3. The method for producing a reduced iron pellet according to claim 1, wherein
an average heating rate at a center of the formed article is 400° C./min or less at the time of heating from 100° C. to 1000° C.

4. The method for producing a reduced iron pellet according to claim 1, wherein
a mass ratio of calcium oxide to silicon oxide in the formed article is 2.2 or less.

5. The method for producing a reduced iron pellet according to claim 4, wherein
a content of halogen in the reduced iron pellet satisfies (F mass %)+0.4(Cl mass %)<0.25%.

6. The method for producing a reduced iron pellet according to claim 1, wherein
total iron content, magnesium oxide content, calcium oxide content and silicon oxide content in the formed article satisfies {(CaO mass %)−(MgO mass %)}/(total iron mass %)<0.1 and {(CaO mass %)−(MgO mass %)/($SiO_2$ mass %)<2.0.

7. A method for producing pig iron, wherein
a reduced iron pellet produced by heating a powder formed article including iron oxide and carbon in a rotary hearth furnace at a temperature of 1250 to 1400° C. under a condition wherein a ratio of carbon monoxide to carbon dioxide in a reduction zone is from 0.55 to 1, in which a content of total iron is 55 mass % or more, a ratio of metallic iron to total iron is 50 to 85%, particles of metal iron with an average of 35 microns or less are coupled to each other to form a metal iron network between the iron oxide and a mixture of other oxides, a porosity is 20 to 50%, and a content of a residual carbon is 2% or less, is fed into an iron producing blast furnace together with ore and sintered ore in a condition that a ratio of the reduced iron pellet having a size of 5 to 20 mm to a total mass of the reduced iron pellet is 80% or more, and the fed pellet is reduced and melted.

8. The method for producing pig iron according to claim 7, wherein
the reduced iron pellet having an inner structure, in which an average diameter of oxide including the iron oxide is 5 to 100 micron and the iron oxide is restricted by the metal iron network, is fed into an iron producing blast furnace together with ore and sintered ore, and is reduced and melted.

9. The method for producing pig iron according to claim 7, wherein
the reduced iron pellet is fed into the iron producing blast furnace at a ratio of 250 kg/metric ton or less with respect to an amount of produced pig iron.

10. The method for producing pig iron according to claim 7, wherein
the reduced iron pellet is fed into a position within ⅔ from the center in a diameter direction of the iron producing furnace, so that a ratio of reduced iron pellets to a total charge of materials in the iron producing blast furnace is 65% or more.

11. A method for producing pig iron, the method comprising producing the pig iron by heating a powder formed article including iron oxide and carbon in a rotary hearth furnace, wherein the reduced iron pellet produced by the method according to claim 1 in which a content of total iron is 55 mass % or more, a ratio of metallic iron to total iron is 50 to 85%, and a porosity is 20 to 50%, is fed into an iron producing blast furnace together with ore and sintered ore in a condition that a ratio of the reduced iron pellet having a size of 5 to 20 mm to a total mass of the reduced iron pellet is 80% or more, and the fed pellet is reduced and melted.

12. A method for producing pig iron, wherein a reduced iron pellet produced by heating a powder formed article including iron oxide and carbon in a rotary hearth furnace at a temperature of 1250 to 1400° C. under a condition wherein a ratio of carbon monoxide to carbon dioxide in a reduction zone is from 0.55 to 1, in which a content of total iron is 55 mass % or more, a ratio of metallic iron to total iron is 50 to 85%, particles of metal iron with an average of 35 microns or less are coupled to each other to form a metal iron network between the iron oxide and a mixture of other oxides, a porosity is 20 to 50%, and a content of a residual carbon is 2% or less, is fed into a vertical furnace, in which an in-furnace space filling ratio of iron chunks and coke chunks is 80% or less, in a condition that a ratio of the reduced iron pellet having a size of 5 to 20 mm to a total mass of the reduced iron pellet is 80% or more, and the fed iron pellet is reduced and melted.

13. The method for producing pig iron according to claim 12, wherein the reduced iron pellet is reduced and melted in a condition that a ratio of the reduced iron pellet to the iron chunks in the vertical furnace is 100% or less.

14. The method for producing pig iron according to claim 12, wherein the reduced iron pellet is fed into a position within ⅔ from the center in a diameter direction of the vertical furnace, so that a ratio of reduced iron pellets to a total charge of materials in the vertical furnace is 70% or more.

15. The method for producing pig iron according to claim 12, wherein a reduced iron pellet produced by heating a powder formed article including at least one of zinc and lead, iron oxide, and carbon in a rotary hearth furnace, in which a total content of zinc and lead is 0.05% or more, is fed into the vertical furnace in which a gas temperature of an upper part of the furnace is 500° C. or more, and is reduced and melted.

16. A method for producing pig iron, the method comprising producing the pig iron by heating a powder formed article including iron oxide and carbon in a rotary hearth furnace, wherein the reduced iron pellet produced by the method according to claim 1 in which a content of total iron is 55 mass % or more, a ratio of metallic iron to total iron is 50 to 85%, a metal iron network is formed between the iron oxide and a mixture of other oxides, and a porosity is 20 to 50%, is fed into a vertical furnace, in which an in-furnace space filling ratio of iron chunks and coke chunks is 80% or less, in a condition that a ratio of the reduced iron pellet having a size of 5 to 20 mm to a total mass of the reduced iron pellet is 80% or more, and the fed reduced iron pellet is reduced and melted.

\* \* \* \* \*